Patented Aug. 28, 1945

2,383,596

UNITED STATES PATENT OFFICE 2,383,596

METHOD OF TREATING FATTY GLYCERIDES

Emil Edward Dreger, Summit, N. J., assignor to Colgate-Palmolive-Peet Company, Jersey City, N. J., a corporation of Delaware No Drawing. Application January 30, 1943, Serial No. 474,177

12 Claims. (Cl. 260—410.9)

The present invention relates to a process for treating fatty materials and, more particularly, to an improved low temperature process for preparing fatty acid esters of ethyl and higher alcohols whereby the esters are readily separable from glycerine formed.

In the prior art, it has been taught that alkyl esters of fatty acids can be prepared by reacting a fat or fatty oil with an alcohol in the presence of a small amount of an alcoholysis catalyst to produce esters of the fatty acid and glycerine, and separating the esters from the glycerine. Although alcoholysis of fatty glycerides with methanol produces a reaction mixture which can be settled and from which a lower glycerine layer can be withdrawn, attempts to carry out the alcoholysis with higher homologues of methyl alcohol provide less satisfactory results, especially at ambient temperatures. Thus, when ethyl or higher aliphatic alcohols are used for the alcoholysis, a separation of glycerine is not immediately obtainable, and the prior art has taught to wash out the alcohol and catalysts with water to effect a separation. This results in aqueous dilution of the glycerine, and, furthermore, the recovered unreacted alcohol has to be dehydrated before being reworked. In another prior art procedure, wherein settling is not employed, the reaction mixture is washed with water, dried and distilled, but the ester yield is low and the glycerine yield is only approximately 40% of the calculated theoretical yield. While alcoholysis with ethyl alcohol at boiling temperatures has been employed by the prior art, such temperatures increase the undesirable tendency of an alkaline alcoholysis catalyst to form soaps with the fatty esters and thus to be removed from the reaction mixture.

It is an object of the present invention to provide an improved process for reacting fatty glycerides with an alcohol having at least two carbon atoms per molecule to produce relatively large yields of fatty esters and glycerine.

It is another object of the invention to provide a new process for reacting fatty acid glycerides with a homologue of methyl alcohol at about room temperatures, especially where minimum amounts of alcohol are employed.

It is also an object of this invention to provide a novel process of low temperature ethanol alcoholysis of fats and fatty oils whereby good yields of glycerine can be obtained.

Other objects and advantages of the invention will be apparent from the following description.

According to the present invention, fats and/or fatty oils are contacted with an alcohol having at least two carbon atoms per molecule together with a relatively small amount of methyl alcohol in the presence of an alcoholysis catalyst. It is preferred that the methyl alcohol be contacted with the fatty glyceride either prior to or simultaneously with the addition of the catalyst. Although the mechanism of operation of the reaction is not fully understood as yet, it is believed that the methyl alcohol or part of it acts as an additional catalyst. Methyl esters are relatively easily formed by glyceride-methyl alcohol exchange, as compared with the formation of homologous alkyl esters, and the resulting methyl esters in turn enter more easily into exchange with the higher homologues of methyl alcohol, such as ethyl alcohol, than do the glycerides. The foregoing theory of reaction is not necessary to an understanding of the present invention and is advanced merely as an aid to the further development of the art.

The reaction is preferably carried out at moderate or ambient temperatures, and the reaction may be brought to completion in a single contacting of the reactants, whereupon two phases appear which can be settled out. In another modification, as disclosed by Joseph Henry Percy in United States application Serial No. 462,369 (filed October 17, 1942), the glycerides may be partially esterified with the alcohols in a first treatment to form a pool of partially reacted material containing monoglycerides and diglycerides, so that the reaction mixture is substantially homogeneous. Additional reactants, such as alcohols and alcoholysis catalyst either alone or with the fatty oil, can be added to this homogeneous mixture without immediately affecting the homogeneity. The reaction is then brought toward completion, and the mixture passes the point of homogeneity, whereby two phases appear. It may be preferred at this point, when using an alkaline catalyst, to add sufficient acid to decompose any soap formed from the catalyst. The phases are separated, the lower or anhydrous glycerine layer containing some of the alcohols being removed for subsequent purification and the upper layer, containing alkyl esters with unreacted alcohols and incompletely reacted glycerides, also being removed for further processing. With incompletely reacted glycerides present, the upper layer is vacuum distilled to recover the esters in the distillate, and the distillation residue may be returned to the reaction pool for reworking along with fresh materials. The separation of glycerine may be carried out stepwise, if desired, adding more alcohol and alcoholysis catalyst to the upper layer after removal thereof, again contacting the reactants in a mixing device, and again separating and removing glycerine. This separation of glycerine may be repeated as many times as desired, the upper layer from the final separation being removed and treated as aforesaid.

The upper layer may be treated in a variety of ways. It may be subjected to an intermediate water wash in batch, intermittent, continuous concurrent or continuous countercurrent operation for the purpose of removing the alcoholysis catalyst, if desired. The upper layer from the glycerine settling, with or without washing, is then subjected to distillation and/or solvent extraction and/or other separation and purification procedure. As mentioned supra, the distillation residue may be returned to the pool of partially reacted material for retreatment, and the desired ester fractions from the distillation and/or extraction, etc., may be recovered.

In carrying out the alcoholysis procedure, the temperature may be regulated as desired. In general, however, an early increase in temperature tends to accelerate the saponification of the alkyl esters by the alkaline catalyst before completion of the alcoholysis, which is an undesirable result. For this reason, temperatures of above 130° C. are usually to be avoided. It is preferred, especially at the start of the reaction, to employ temperatures of about 20° C. to about 50° C., and particularly satisfactory results have been obtained when operating at about 40° C. to about 50° C., especially in ethanolysis. In general, the operation may be carried out at reduced pressures, at atmospheric pressure or at superatmospheric pressures.

The fat and/or fatty oil treated may be any of those suitable for employment by the soap-making art in any of the processes heretofore known, especially those containing glycerides of fatty acids having about eight to about twenty-six, and preferably about twelve to about twenty, carbon atoms per molecule. These include coconut oil, palm oil, olive oil, cottonseed oil, corn oil, tung oil, wool fat, tallow, whale and fish oils, soya bean oil, tall oil, etc. Although unrefined materials may be used, it is preferred to use a refined oil containing substantially no moisture, as alcoholysis with an alkaline alcoholysis catalyst has its greatest effectiveness under anhydrous conditions. The presence of excessive free fatty acid is also deleterious, as it destroys an alkaline alcoholysis catalyst by converting it into soap. If sufficient alkaline catalyst is added to give an excess of alkali above that destroyed by large amounts of free fatty acid present, a large amount of soap forms and gels, which interferes with the separation of the alcoholysis mixture. Even if the separation is accomplished, practically all of the soap goes to the glycerine layer and must be recovered during the glycerine refining.

The refining of the oil may be accomplished by any suitable process. However, economies can be effected by using unrefined oil and introducing a preliminary alcohol refining treatment before the alcoholysis. In a suitable procedure, such as is disclosed by Glenn Ashmore Glossop in United States application Ser. No. 462,371 (filed October 17, 1942), the unrefined oil is extracted with a lower aliphatic alcohol, preferably ethanol with or without a small proportion of methanol.

In carrying out the alcoholysis according to this invention, short chain aliphatic alcohols having at least two carbon atoms per molecule, and including aryl-substituted aliphatic alcohols, are preferably employed, particularly the saturated, primary alcohols, especially alcohols having a boiling point in the presence of water in excess of the azeotropic composition of lower than 100° C. at atmospheric pressure and, more particularly, the lower homologues of methyl alcohol having two to about six carbon atoms per molecule. Thus, alcohols satisfactory for use in forming esters with the fatty acid components of the glycerides treated include such low molecular weight monohydric alcohols as ethyl alcohol, propyl alcohol, isopropyl alcohol, n-butyl alcohol, isobutyl alcohol, tertiary butyl alcohol, the amyl alcohols, benzyl alcohol, etc. Although it is preferred to employ an amount of alcohol at least about twice the calculated theoretical amount necessary for alcoholysis of the particular glycerides treated, whereby smaller amounts of catalyst may be used, it is a feature of the invention that smaller proportions of the alcohol, say about a 50% excess over the calculated stoichiometric amount required for reaction with the amount of glyceride present, or less, may be employed. A small amount of methyl alcohol is also introduced into the reaction mixture, and this may be added either separately or together with the alcohol of at least two carbon atoms which forms the major portion of the alcohol added. In general, the methyl alcohol added is about 10% to about 30% on a mol basis of the total alcohol introduced for the alcoholysis reaction, although smaller or larger proportions may be used, depending upon the character and quality of the glycerides employed. In the case of ethyl alcohol, the addition of about 10% to about 20% of methyl alcohol is satisfactory for facilitating the separation of a glycerol layer. Under suitable conditions, an even smaller amount of methanol can be used, especially where adjuvant materials are employed. Thus, alcoholysis with ethyl alcohol containing about 6% of methyl alcohol together with about 1% of ethyl acetate and about 1% of gasoline gives a reaction mixture from which a glycerine phase readily separates. Thorough drying of all of the materials which enter into the reaction mixture facilitates the separation of glycerine and permits separation of a glycerine layer with about 6% or less of methanol alone.

In selecting an alcoholysis catalyst, an alkaline, a neutral or an acid catalyst may be employed. Generally speaking, it is preferred to employ an alkaline catalyst, but the methods herein described are also applicable to acidic alcoholysis catalysts. Among the catalysts which have been found suitable for use in the present process are sodium hydroxide, sodium methylate, sodium carbonate, lime, boron trifluoride, aluminum chloride, glycerine sulphate, sulphuric acid, organic sulphonic acids, organic sulphonates, etc. A convenient way of introducing the catalyst into the reaction mixture is in admixture with and, where practical, advantageously in solution in either or both of the methyl alcohol and the other alcohol employed, preferably in a mixture of the two alcohols. The catalyst may alternatively be introduced separately from the alcohols, but it is preferred that it be added to the reaction mixture simultaneously with or subsequent to the introduction of the methanol.

The esterified material may be treated in any of several ways, as aforesaid and as pointed out in the Percy application Serial No. 462,369. The ester fractions obtained according to the present invention, with or without washing and/or subsequent purification, can be employed in many chemical processes and products, as in the paint, perfumery, lubricating oils, medicinals and other fields. They may be used in many chemical syntheses, and one of their greatest outlets for volume consumption is in the soap-making industry.

The following examples described herein are merely illustrative of the present invention, and it will be understood that the invention is not limited thereto. Example III has been included for the purpose of indicating the difference in yield when methyl alcohol is omitted from the reaction mixture.

*Example I*

Coconut oil, refined and substantially anhydrous, is run into a reactor at the rate of about 215 parts by weight per minute. About 0.5 part of solid, substantially anhydrous sodium hydroxide is dissolved in a substantially anhydrous mixture of about 62 parts of ethyl alcohol and about 6.5 parts of methyl alcohol, and the alcoholic solution is run into the reactor at a rate of about 69 parts per minute. The material is contacted in the reactor for about one hour at about 40° C., and it is then allowed to settle. A lower layer containing more than half of the theoretical amount of glycerine producible by the reaction separates and is withdrawn. The upper layer is washed with water and is run into a still where the unreacted alcohols are removed by distillation. Continuing the distillation under vacuum, an amount of methyl and ethyl esters equivalent to about 90% of the calculated theoretical yield obtainable is distilled off; this corresponds to about 70% of the theoretical glycerine yield.

*Example II*

The procedure of Example I is repeated, using approximately the same proportions of reactants and the same reaction conditions. However, after completing the reaction, settling, and withdrawing the lower glycerine layer, the upper layer, instead of being washed and distilled, is passed to a second reactor where it is contacted with about 46 parts per minute of the ethyl-methyl alcoholic solution of sodium hydroxide. After thorough contacting for an additional period of about one hour, the reaction mixture is again allowed to settle, and another layer of glycerine separates therefrom and is removed. The upper layer from the second settling is then washed and distilled in the same manner as set forth in Example I, first removing substantially all unreacted alcohols, and an amount of esters equivalent to about 98.5% of the calculated theoretical amount producible is obtained. This high yield of esters corresponds to a yeild of about 95% of the calculated theoretical amount of glycerine which can be obtained. Determination of the proportion of methyl esters to ethyl esters in the distilled esters is then made by saponifying said esters, recovering the resulting alcohols and fractionating. It is determined that the distilled esters contain less than about 15% of methyl esters, substantially all the remainder being ethyl esters.

*Example III*

About 215 parts per minute of refined, substantially anhydrous coconut oil is run into a reactor. Ethyl alcohol alone containing about 0.75% sodium hydroxide is also run into the reaction vessel at a rate of about 70 parts per minute, and the materials are contacted in the reactor for about seven hours at about 40° C. The reaction mixture is then run into a settling tank, but no glycerine layer separates. The entire reaction mixture is thereafter washed with water, dried and distilled, and the yield of distilled esters is about 79% of the calculated theoretical yield obtainable. This corresponds to a glycerine yield of only about 40% of the calculated theoretical yield.

*Example IV*

Cottonseed oil, refined by extraction of free fatty acids with anhydrous ethanol and preheated to about 65° C., is passed into a mixing vessel or contactor at a rate of about 1,000 parts by weight per minute. About 5 parts of sodium methylate are dissolved in a mixture of about 169 parts of ethyl alcohol and about 26 parts of methyl alcohol, and the alcoholic solution is run at about room temperature into the contactor at a rate of about 200 parts per minute. The materials remain in contact in the vessel for about five minutes and then overflow into a combined time vessel and settling tank, wherein the mixture separates into two phases and from which a glycerine layer can be withdrawn at the bottom thereof. The upper layer is passed into a mixer provided with stirring means and is there mixed with about 100 parts per minute of the ethyl-methyl alcoholic solution of sodium methylate described. The mixture thus formed passes through a reactor during a time interval of about thirty minutes and is run into a second settling tank, where a further glycerine layer is separated out and withdrawn. The overflow from the settling tank is run into a distillation apparatus, where the esters and unreacted alcohols are separately distilled off. The distillation residue is returned to the contactor to be reworked.

Although the present invention has been described with reference to particular embodiments and examples, it will be apparent to those skilled in the art that variations and modifications of this invention can be made and that equivalents can be substituted therefor without departing from the principles and true spirit of the invention.

I claim:

1. The process which comprises reacting a fatty glyceride with a low molecular weight monohydric alcohol having at least two carbon atoms per molecule in the presence of methyl alcohol.

2. The process which comprises reacting a fatty glyceride with an aliphatic monohydric alcohol having two to about six carbon atoms per molecule in the presence of methyl alcohol and of an alkaline alcoholysis catalyst.

3. The process which comprises reacting a fatty glyceride with a low molecular weight monohydric alcohol having at least two carbon atoms per molecule in the presence of methyl alcohol and of an alcoholysis catalyst.

4. A process of producing alkyl esters which comprises reacting a fatty glyceride with a low molecular weight monohydric aliphatic alcohol having at least two carbon atoms per molecule and with methyl alcohol in the presence of an alcoholysis catalyst, said methyl alcohol being in sufficient amount to facilitate separation of the reaction mixture into two liquid phases.

5. A process for producing ethyl esters which comprises reacting under substantially anhydrous conditions a fatty glyceride with ethyl and methyl alcohols in the presence of an alcoholysis catalyst, said methyl alcohol being present in an amount at least about 6% on the basis of total mols of alcohols.

6. A process for producing alkyl esters which comprises reacting a fatty glyceride with a saturated primary aliphatic alcohol having two to about six carbon atoms per molecule and with about 10% to about 30% of methyl alcohol on the basis of total mols of alcohols present in the presence of an alcoholysis catalyst and for a time at least sufficient to form a separate glycerine phase, whereby a liquid body containing glycerine and alkyl esters including methyl esters is produced; removing a lower glycerine layer from said body to leave an upper layer containing the esters and unreacted alcohols; and recovering said esters from said upper layer.

7. A process for producing ethyl esters which comprises reacting a fatty glyceride with ethyl alcohol and about 10% to about 30% of methyl alcohol on the basis of total mols of said alcohols present in the presence of an alkaline alcoholysis catalyst and for a time at least sufficient to form a separate glycerine phase, whereby a liquid body containing glycerine and methyl and ethyl esters is produced; removing a lower glycerine layer from said body to leave an upper layer containing methyl and ethyl esters and unreacted methyl and ethyl alcohols; removing methyl and ethyl alcohols from said upper layer; and recovering the esters from the residue of said upper layer.

8. A process for producing alkyl esters which comprises establishing a liquid pool containing a fatty glyceride, an aliphatic monohydric alcohol having two to about six carbon atoms per molecule, methyl alcohol, alkyl esters including methyl esters, glycerine and partially reacted glycerines by partially reacting fatty gylceride with said alcohols; continuously introducing into said liquid pool a fatty glyceride, an aliphatic monohydric alcohol having two to about six carbon atoms per molecule, methyl alcohol and an alcoholysis catalyst; continuously withdrawing a portion of said liquid pool; regulating the rates of said introduction and said withdrawal with respect to the size of the liquid pool to keep the fatty glyceride and the alcohols in contact in the pool in the presence of the alcoholysis catalyst for a time interval insufficient for the reaction to go to completion, whereby a substantially homogeneous phase is maintained in said liquid pool; further contacting the materials in the withdrawn portion for a time interval at least sufficient to form a separate glycerine phase, the methyl alcohol being used in sufficient amount to facilitate separation of the glycerine phase; removing glycerine from said portion to leave a mass containing unreacted al cohols and alkyl esters including methyl esters. and recovering said alkyl esters from said mass 9. A process which comprises establishing a substantially anhydrous liquid pool containing a fatty glyceride, methyl and ethyl alcohols, methyl and ethyl esters, glycerine and partially reacted glycerides by partially reacting fatty glyceride with said alcohols; continuously introducing into said pool a fatty glyceride, ethyl alcohol and at least about 6% of methyl alcohol on the basis of total mols of alcohols introduced, together with an alcoholysis catalyst; continuously withdrawing a portion of said liquid pool; regulating the rates of said introduction and said withdrawal with respect to the size of the liquid pool to keep the fatty glyceride and the alcohols in contact in the pool in the presence of the alcoholysis catalyst for a time interval insufficient for the reaction to go to completion, whereby a substantially homogeneous phase is maintained in said liquid pool; further contacting the materials in the withdrawn portion for a time interval at least sufficient to form a separate glycerine phase; removing glycerine from said portion to leave a mass containing methyl and ethyl esters and unreacted methyl and ethyl alcohols; and recovering said esters from said mass.

10. A process which comprises establishing a liquid pool containing a fatty glyceride, methyl and ethyl alcohols, methyl and ethyl esters, glycerine and partially reacted glycerides by partially reacting fatty glyceride with said alcohols; continuously introducing into said liquid pool a fatty glyceride, ethyl alcohol and about 10% of methyl alcohol on the basis of total mols of alcohols introduced, together with an alcoholysis catalyst; continuously withdrawing a portion of said liquid pool; regulating the rates of said introduction and said withdrawal with respect to the size of the liquid pool to keep the fatty glyceride and the alcohols in contact in the pool in the presence of the alcoholysis catalyst for a time interval insufficient for the reaction to go to completion, whereby a substantially homogeneous phase is maintained in said liquid pool; further contacting the materials in the withdrawn portion for a time interval at least sufficient to form a separate glycerine phase; removing glycerine from said portion to leave a mass containing unreacted alcohols and methyl and ethyl esters; and removing the alcohols from said mass, whereby ethyl and methyl esters are produced.

11. The process which comprises adding an alcohol having from two to about six carbon atoms per molecule, an alcoholysis catalyst and methyl alcohol to fatty glyceride; reacting the glyceride with said alcohols to produce glycerine and esters of fatty acids from said glyceride with said alcohols; and separating the esters and glycerine; the amount of methyl alcohol used being sufficient to facilitate said separation.

12. The process which comprises reacting fatty glyceride with methyl alcohol and a higher homologue thereof having not more than about six carbon atoms per molecule in the presence of an alcoholysis catalyst, whereby a liquid reaction mixture containing unreacted alcohols, unreacted glyceride, partially reacted glycerides, glycerine, and esters of fatty acids with said alcohols is obtained; the amount of said methyl alcohol used being sufficient to facilitate separation of said liquid reaction mixture into two liquid phases; and separating said phases.

EMIL EDWARD DREGER.

CERTIFICATE OF CORRECTION.

Patent No. 2,383,596.　　　　　　　　　　　　　　　　August 28, 1945.

EMIL EDWARD DREGER.

It is hereby certified that error appears in the printed specification of the above numbered patent requiring correction as follows: Page 2, second column, line 75, for "and/of" read --and/or--; page 3, first column, line 58, for "yeild" read --yield--; page 4, first column, line 36, for "glycerines" read --glycerides--; and that the said Letters Patent should be read with this correction therein that the same may conform to the record of the case in the Patent Office.

Signed and sealed this 20th day of November, A. D. 1945.

Leslie Frazer (Seal)　　　　　　　　　First Assistant Commissioner of Patents.